Nov. 18, 1930.  F. E. PIERCE  1,781,702
PROCESS OF MANUFACTURING HIGH GRADE ZINC OXIDE
Original Filed July 9, 1921  4 Sheets-Sheet 1

Nov. 18, 1930.    F. E. PIERCE    1,781,702
PROCESS OF MANUFACTURING HIGH GRADE ZINC OXIDE
Original Filed July 9, 1921    4 Sheets-Sheet 4

Patented Nov. 18, 1930

1,781,702

UNITED STATES PATENT OFFICE

FREDERIC E. PIERCE, OF NEW YORK, N. Y.

PROCESS OF MANUFACTURING HIGH-GRADE ZINC OXIDE

Application filed July 9, 1921, Serial No. 483,552. Renewed March 30, 1928.

The processes hitherto generally used for the manufacture of zinc oxide are the so-called French process and the Wetherill grate process. In the former zinc metal is charged in retorts which are set in gas fired reverberatory furnaces. The heat of the laboratory in these furnaces is brought up sufficiently high to melt and volatilize the zinc in the retorts. During the heating carbon monoxide is introduced into the charging end of the retorts under a slight pressure thereby excluding contact of the zinc with air and at the same time establishing reducing atmosphere in the retorts, thus preventing the formation of zinc oxide which would choke them up and make the process non-operative. The zinc vapors evolved with the carbon monoxide gas emerge from the outlets of the retorts into an uptake flue and coming in contact with air passing up through the said uptake flues, burn therein and are drawn over to settling chambers by a fan, and finally pass to a bag house. The oxide is drawn from hoppers in the bottom of the settling chamber or from the bags in the bag house and as collected is of several different grades. The part settling out near the furnace being the poorest grade, that further along being intermediate and that in the latter part of the chamber and in the bag house being the highest grade, generally called white seal. This oxide is not in merchantable form as collected but has to be reheated to improve its color. The reheating has to be done with great care but when so done the color of the oxide is improved so that it is the best oxide on the market.

The Wetherill grate process consists of mixing thoroughly oxidized ores finely crushed, with fuel, very low in volatiles, such as Pennsylvania anthracite rice, making a charge that is spread over a bed fire of similar fuel in a so-called muffle furnace with one or more outlets in the roof. The bed fire and charge rest on a perforated grate under which a blast of air is introduced thus producing and maintaining the combustion by which zinc fume and oxide are developed and are drawn over, sometimes through settling chambers but more commonly through a series of pipes by a fan, and forced to the bag house where the oxide is collected. The blast of air frequently causes so-called blow holes in the charge owing to the lack of uniformity in the latter. The combustion is intense around these blow holes because most of the blast thus passes through them. In this way fine particles of ore, ashes and foreign matter are carried over with the gas and fume and collected with the oxide. These particles of foreign matter appear under the microscope as black specks and are always present to a greater or less extent in oxide made by this process and characterize it. The oxide is generally packed without any further treatment. Oxide made by the Wetherill grate process is commonly styled American process oxide.

One of the principal defects of this product is the frequent presence of high percentages of soluble sulphates, principally zinc sulphate, for which the sulphur in the coal and ore is mainly responsible. If it is possible to keep down the sulphur content in the raw materials to low percentages, zinc oxide can be manufactured by the Wetherill grate process so as to have less than 1% of soluble sulphates, which is the ordinary specification for high grade zinc oxide. If the oxide is manufactured from roasted sulphide ore, it is extremely difficult to roast it so that the sulphur content is at the low limits required. Consequently zinc oxides made from sulphide ores are generally high in zinc sulphate.

The reheating of this Wetherill oxide seldom improves it, although Wemple (U. S. Patent No. 1,292,976) does reheat it after admixing carbon or carbonaceous material with it and thereby obtains a product of better color, freed to some extent from soluble sulphates, but oxide so treated is impaired in texture and is less desirable for many purposes.

With the French process the soluble sulphates are always very low, usually between .2% and .3%.

It has also been proposed by Hall (U. S. Patent No. 1,276,058) and by Skinner (U. S. Patent No. 1,350,286) to smelt mixed sulphide ores in a reverberatory furnace, volatilizing the zinc and some of the lead and concentrating the copper, gold, silver and more of the lead into the form of a matte and in fluxing off the gangue in the slag. This process has been worked out in one or two places, but so far as I am aware high grade zinc oxide has not so far been produced by it. It has been necessary to resmelt it in a Wetherill grate plant in order to produce a merchantable oxide.

I have discovered that if the reverberatory furnace is fired with gas or fuel oil and put in connection to a properly designed combustion chamber and the operation is so regulated that substantially all the zinc vapors are burned in the combustion chamber at a predetermined temperature and with little and preferably no such burning in the furnace itself a very distinct improvement is obtained. The zinc oxide not only has a good color and texture but also is low in soluble sulphates.

I have also discovered that it is a distinct advantage to treat in this way ores very rich in zinc and that crude zinc oxides, which may be high in soluble sulphates, lend themselves to treatment in this manner, and that the resulting product is a very high grade of zinc oxide being extremely low in soluble sulphates, having a good color and texture and when reheated approaching closely the quality of the French process zincs.

The new process has the very decided merit of doing away with the multiplicity of small retorts with their constant replacement and with the production of carbon monoxide gas in order to maintain the reducing atmosphere within the retorts. It also has the very distinct advantage over the Wetherill grate process of using much less fuel and in eliminating the chances of carrying over fine particles of ore and ash into the finished product, and in producing a zinc oxide low in zinc sulphates. It has the further advantage of being susceptible of the nicest regulation, even when the units are of large size. Thus the initial plant costs are less and the operating costs are reduced because less fuel and labor are necessary.

In my new process substantially all the zinc vapors are burned outside of the reverberatory furnace and in a combustion chamber, following the furnace and I have found that it is essential that the temperature of this combustion be predetermined and at least about 2000° F. but in no case higher than about 2350° F. It is however, indispensable that not only this operation but the subsequent treatment of the fume, be along well defined lines in order to produce high grade zinc oxide, and I now proceed to describe the whole operation in more detail.

I have discovered that in order to obtain the best results the size and arrangement of the combustion chamber should bear a definite relation to the density and volumes of zinc vapors to be burned or oxidized and should be adapted, in point of its superficial area, and other temperature controlling factors to maintain a temperature therein graduating from a maximum of about 2350° F. at the point of greatest intensity to a temperature of between 1100° F. and 1300° F. at or near the point of exit.

In order to oxidize substantially all the zinc vapors in the combustion chamber it is necessary that air inlets or ports be provided to admit the necessary air for oxidation of the fume and unburned gases from the reverberatory furnace, and in order to promote the thorough mixing of such gases and vapors with the admitted air, the combustion chamber is constructed with baffle walls or other devices for producing turbulence.

In order to secure the predetermined temperature of combustion it may be necessary in some cases to preheat some or all of the air admitted which can be done by running the air ducts along the walls or floor of the furnace.

The process further consists in conducting the oxidized gases from the combustion chamber, from which they emerge, at a temperature between 1100° F. and 1300° F. as above stated through a pipe-flue or trail to an exhaust fan, which fan creates a draft extending to the reverberatory furnace through the combustion chamber. The trail is preferably of such cross sectional area and of such superficial area as to cool the gases to a great extent before they reach the fan and to a temperature of about 500° F. The size and length of the trail although primarily dependent on the amount of zinc smelted and secondarily on the cost of the construction and the power required for operation, may however be varied according to conditions. The temperature of the gases and fume can be further controlled by the admission of more or less cooling air through adjustable openings spaced along the trail. Such adjustable openings also serve to control the draft in the furnace and the combustion chamber. As the fan can be operated at variable speed the draft control can be regulated thereby at the furnace and at the combustion chamber, and I also may control the general temperature of these parts by adjusting the air inlets in the trail.

The process further consists in passing the gases and fume through a cyclone or centrifugal separator so designed as to perform a selective separation of such heavy foreign matter as particles of ore or ashes and of heavy and gritty particles of oxide such as may be carried over with the gases and fume and thus purify the fume before it is collected in the bag house as zinc oxide. The cyclone is between the fan and the bag house and together with the interconnecting pipe-flues provides sufficient exposure to give an additional cooling of the gases and fume before arrival at the bags.

The temperatures throughout the process are affected by atmospheric conditions. The amount of dilution air to be admitted is controlled accordingly but it is necessary that the temperature be under control and no matter what the external conditions are, be susceptible of regulation within the limits above stated.

I have found that the employment of certain proportions in the design of constituent parts of a zinc oxide plant with the proper regulating devices enable me to operate a plant so that the temperatures of combustion and the rates of cooling heretofore specified are easily obtained and maintained and that by means of these operating conditions a high degree of operating efficiency is effected and a high grade zinc oxide produced.

Oxide thus produced is very light and bulky and if slightly reheated is improved in color without suffering any defect in texture.

I have discovered that the heating of the product of this process in a muffle furnace to a temperature of 1000° F. to 1100° F. for about one-half hour generally improves its color to such an extent that it closely approaches the quality of French process zinc oxides.

To show more clearly the arrangement of the parts and the parts themselves of the plant I refer to the drawings herewith: Fig. 1 is a diagrammatic plan of the plant and Fig. 2 a diagrammatic elevation in which A denotes the reverberatory furnace, K the connecting flue to B, the combustion chamber, C the trail, D, the fan, motor driven, E, the separator, F the bag house and G the reheating furnace.

Figure 3:
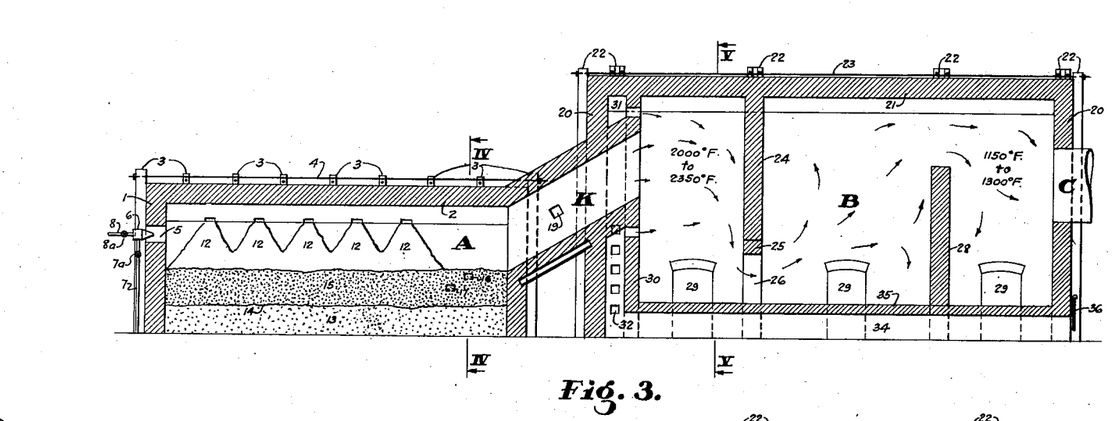
Fig. 3 shows the furnace and combustion chamber in longitudinal section somewhat shortened for convenience.
Figure 4:
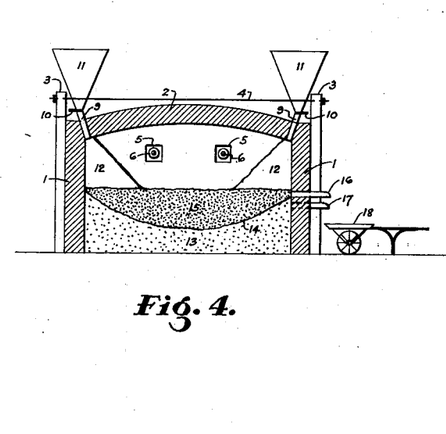
Fig. 4 is a cross section of the furnace on line IV—IV.
Figure 5:
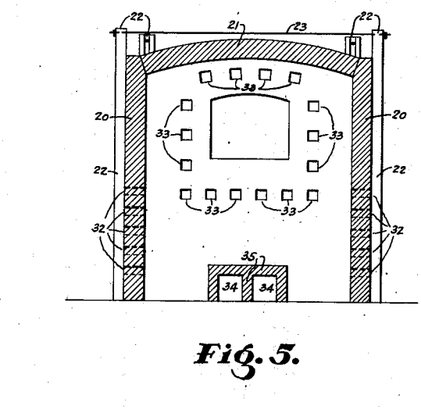
Fig. 5 is a section on line V—V of Fig. 3.

The furnace, roughly about four times as long as wide, commonly has heavy fire brick walls, 1, covered by a fire brick arch, 2, usually made of silica brick. The arch and walls are braced by buckstays 3 held together by tie rods, 4. At the front end apertures 5 allow oil burners 6, with oil pipes 7, and air pipes 8, equipped with valves 7ª and 8ª to be mounted for firing the furnaces. The charge consisting of partially roasted sulphide ores containing zinc, lead, copper, iron etc., or of other ores or materials herein mentioned, with the necessary fuel such as coal or coke, with flux such as lime-rock and silica, is mixed at a mixhouse and delivered by any convenient means to the mixed charge bins, 11, from whence it is dropped into the fettling pipes 9 by opening the valves 10, and thus passes through the arch of the furnace, at the springing line, and forms the fettling piles 12, along the side walls of the furnace. The mixed-charge bins 11, in Fig. 4, are omitted in Fig. 3, but they can be either continuous or separate bins as may be desirable.

In starting up the furnace the walls are first dried out well with a wood fire and the bottom is filled with silica or quartz sand 13, up to a line shown approximately as 14. The furnace is then fired by means of the oil burners until the silica begins to fuse. Then rich copper-iron sulphide otherwise known as matte or other suitable hearth-forming material is charged and works down into the silica or quartz sand. After this the mixed charge above referred to is fed into the furnace. As the products of the burning oil pass through the furnace they heat the charge in the fettling piles 12, and in the hearth 15, which from the heat both direct and radiant from the arch becomes intensely hot as will be understood.

The carbon in the charge and the oil gases acts on the ore and flux and reduces the metals therein, volatilizing most of the zinc while the copper, silver and gold, and lead, fall down as sulphide on the matte on the hearth. The slag also falls down but floats on top of the matte. The slag and matte are drawn off at intervals from the slag tap 16 and the matte tap 17 into suitable slag or matte cars indicated by 18 in Fig. 4.

The air admitted to the furnace is partly controlled by the air valve 8ª in the air pipe and also by choking down or enlarging the apertures 5, and by the control of the draft pull on the system as explained later.

The connecting flue K is made of fire brick supported on steel beams. In the side walls there are open observation holes 19, and by means of these and the character of the slag and matte the conditions of the smelting operation can be observed and the necessary adjustments made in the charging, draft-regulations, etc. The connecting flue should be as short as possible and in the case in hand should have a cross sectional area of 7% to 10% of the hearth area.

The combustion chamber B, is made of fire brick walls 20, and covered by a fire brick arch 21. The flue K enters at the front end and the trail C starts at the rear end. It is from 10% to 15% longer than the furnace and approximately the same width but the cross sectional area should be from 25% to 30% of the hearth area of the furnace. It is supported and braced by buckstays 22, and tie rods, 23. It has a depending baffle wall 24, spaced approximately from the front end 30% of the length of the chamber. This is supported by an arch 25, which is the top of a passage way 26 under the baffle wall. The area of this passage way is preferably about double the area of the connecting flue K. An upright baffle wall 28 is located in the rear end of the chamber and is spaced from the rear and about 30% of the length of the chamber. The height of this baffle wall is about 2/3 of the height of the chamber. There are cleanout openings 29. These are normally closed by brick, loosely laid in place and mudded up.

In the front end of the combustion chamber there is a brick wall 30, parallel to the front wall and spaced from it, and the connecting flue K extends through the space 31, between them, which space is about 9 in. to 12 in. wide and air is admitted to this space by the openings 32 in the side walls of the combustion chamber. These openings can be more or less filled up with loose brick, mudded in place, and the amount of air admitted thus regulated. In the brick wall 30 and surrounding the opening of the flue K there are a plurality of ports 33, allowing the air to enter the combustion chamber as an envelope around the stream of gases and vapors coming from the reverberatory furnace. A duct or ducts, 34, made of fire brick 35, extend from the rear end of the combustion chamber to the air space 31. Adjustable gates 36 cover the openings of these ducts so that more or less air can be admitted through them. The air is drawn through by the draft set up by the fan previously mentioned. The air passing through the duct 34 is preheated by the burning gases and vapors in the furnace and a regulation of the amount passing through the duct and the cold air admitted through the ports 32, permits of the regulation of the temperature of the envelope referred to as well as the combustion in the fore part of the combustion chamber and so that it will be between 2000° and 2350° F. as above stated.

The baffle walls 24 and 28 located in the positions shown provide a sufficient mixture and turbulence effect in the gases and vapors ensuring complete combustion, but other means may obviously be provided to this end.

The size of the combustion chamber as specified is such that by the natural radiation from the walls and arched top, a temperature gradient in the gases and fume is established so that the temperature of the gases will be between 1100° F. and 1300° F. in the last part of the chamber and as they enter the trail C, but it will be understood that where such a gradient is not naturally established various means may be employed to produce an equivalent effect.

Figure 6:
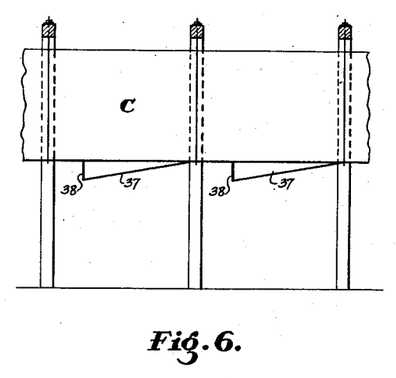
Fig. 6 is a side elevation of a portion of the trail and Fig. 7 a section thereof.
Figure 7:
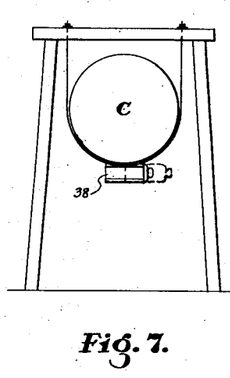

The trail C is shown supported so that the bottom is about 6 ft. above the ground. It has cleanout hoppers 37 in the ends of which are adjustable gates 38, which may be shut entirely, or more or less opened as may be required to control the draft on the furnace or for cooling the gases and fumes, such gates thus serving the double function of regulation and cleaning out.

The trail is preferably made of sheet steel and its cross sectional area from 1/20 to 1/25 of the hearth area of the furnace. It should have a length of about 500 to 600 ft. When so proportional the temperature gradient of the gases in the trail, will be about 1° F. per ft. of length of the trail which can be further controlled by the admission of cooling air along the trail, so that the temperature of the gases when they reach the fan is approximately 500° F.

Figure 1:
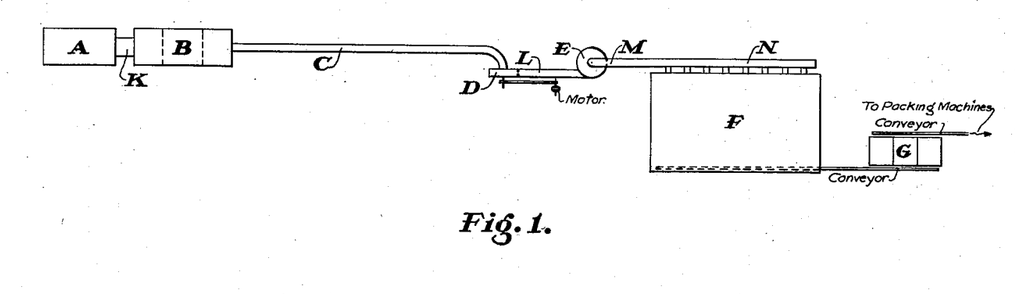
Figure 2:
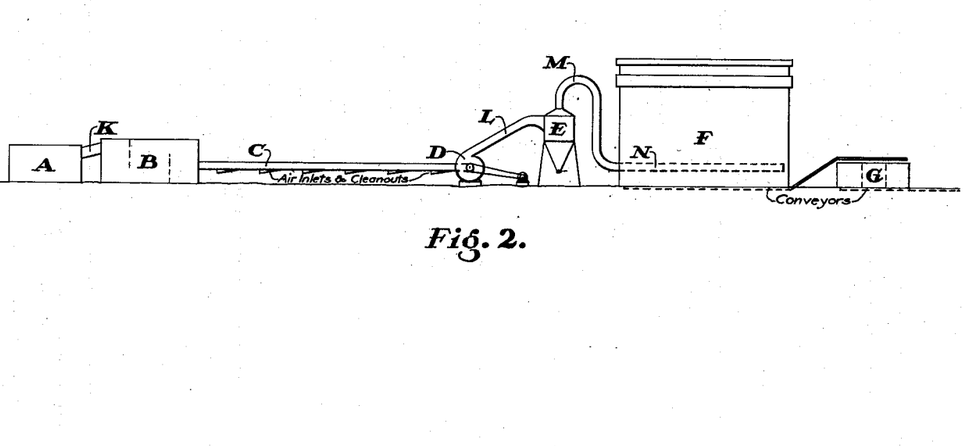

The fan D may be of any suitable size adapted to handle hot gases and fumes.

Figure 8:
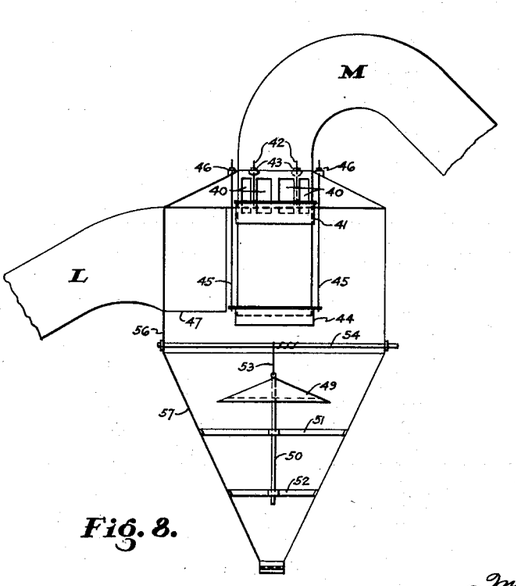
Fig. 8 a section of the separator.

The centrifugal separator or cyclone E may also be of any well known standard pattern but it is provided with adjustments to control the selective separation of foreign matter and gritty particles.

Fig. 8 shows in sectional elevation a type of cyclone which is satisfactory. In the upper part of the central outlet pipe M within the casing there is a plurality of rectangular openings 40, for short circuiting some of the gases and fume direct from the inlet pipe L. A sliding sleeve 41 is supported and held in position by rods 42, extending through the top plate of the casing. These rods are threaded at the upper ends and have nuts 43 on them and by means of these nuts the sleeve can be raised and lowered and more or less of the openings 40 blocked off. Another sliding sleeve 44 supported by rods 45 the top ends of which are threaded and provided with nuts 46, is held in position at the bottom of the outlet pipe M. By raising and lowering this sleeve the effective distance between the bottom of the outlet pipe M and the bottom line 47 of the inlet pipe L can be adjusted and the selective separation thereby controlled. A cone 49 is hung by a chain 53 from a rotary windlass shaft 54, mounted in the body 56. The cone is provided with a stem 50 which is centered and guided in two spider frames 51 and 52 secured to the casing wall 57. The distance of the cone below the bottom of the outlet pipe affects the selective separation of foreign and gritty matter from the gases and fumes and the necessary adjustment of its position is obtained by the rotation and setting of the shaft 54. This together with the short circuit passages, and the sleeve on the bottom of the outlet pipe give ample adjustment facilities for controlling the separation.

The cooling of the gases after they pass through the fan D, flue L, cyclone E, the flue M, and the bag house header N, is such that they enter the bags in the bag house at between 250° F. and 350° F., which tends to prevent the condensation of sulphuric anhydrid and its resulting combination with zinc oxide forming the objectional zinc-sulphate.

Figure 9:
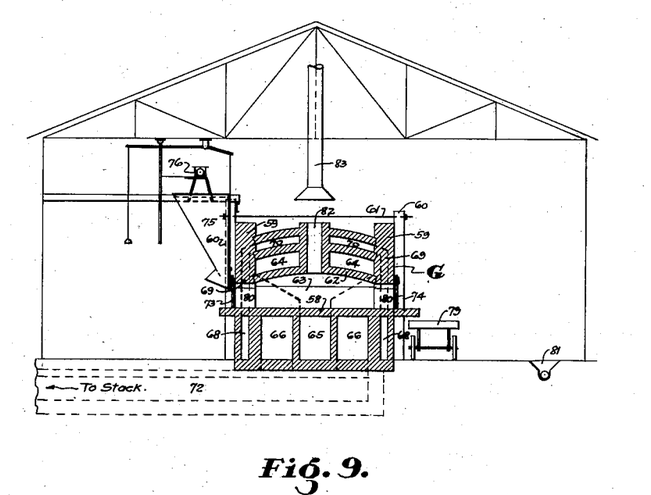
Figs. 9 and 10 are respectively section and elevation of the reheating furnace.
Figure 10:
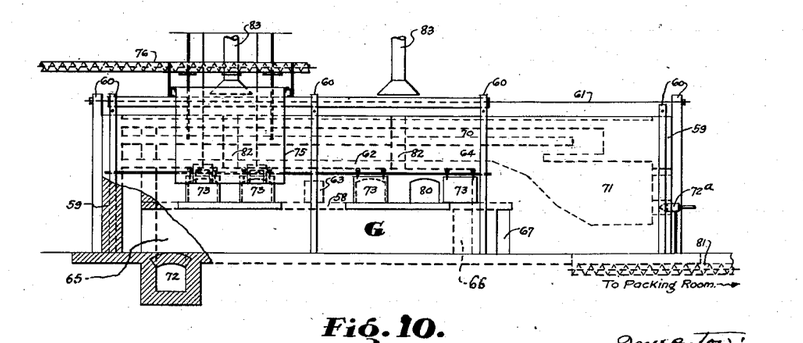

The reheating furnace, Figs. 9 and 10, is of the so called muffle type and consists of one or more hearths 58, of fire brick tile, in this case two, a convenient size of which is 6 ft. by 6 ft. The furnace has fire brick side and end walls 59, well braced with buckstays 60, held by tie rods 61. A low flat fire brick arch 62, extends over the hearths, which are divided by low partition walls 63. The hearths are about 2 ft. 6 in. above the floor of the building and there are passages for fire gases, the combustion chamber 64, above and the flues 65 and 66 below. Air for combustion, admitted at the ports 67, passes through the lower side walls in the ducts 68, up through the risers 69, in the air preheating chamber 70, and finally meets the fire gases at the entrance of the combustion chamber 64. The fire gases in this case come from the oil burner 72$^a$, and pass through the fire box 71, and so on through the combustion chamber to a down take leading to the flue 65, then to the fire box end of the furnace under the hearth 58, where they divide and pass back again in the flues 66, to the stack flue 72. The air passages insulate the fire gases so that a large proportion of their heat is transferred through the fire brick to the hearths. Each hearth of the furnace has door openings 80, covered by sliding fire brick doors 73, and 74, by means of which oxide is charged and drawn from the furnace. Untreated oxide is delivered by the screw conveyor 76, to the hoppers 75, and by appropriate mechanical devices under control is charged in the customary way. The oxide so charged is spread evenly over the hearth and allowed to stand for a sufficient length of time, usually about a half hour, and is drawn out through the door openings 80, on the discharge side to cooling pans 79. During the heating some gases are evolved and the arches over the furnace are constructed with vents 82, over which are hooded pipes 83 to conduct the gases out of the building. After cooling in these pans for a sufficient length of time the oxide is dumped from them to the conveyor 81, by which it is delivered to the packing room.

The manufacture of zinc oxide of great purity depends very largely on the purity of the raw materials whether the French, Wetherill grate or the reverberatory process be employed, but I have discovered that with the richer ores better results can be obtained because the zinc vapors and zinc fume are more concentrated and contain relatively less of the gaseous impurities which tend to produce impure zinc oxide. Thus with the reverberatory process ores very rich in zinc contents, and such ores are more commonly free from impurities, can be readily and most economically smelted with a resulting high grade zinc oxide, and this oxide by simple reheating is markedly improved in color so that it approaches in grade the well known French process zinc oxides.

I have further discovered that crude zinc oxides produced by any process and containing high percentages of such impurities as soluble sulphates can be resmelted in a reverberatory furnace and thus produce a highly concentrated zinc vapor and fume which when collected as oxide is of a very high grade and when reheated approaches the grades of the French process zincs.

The process above described consists of the following steps viz:—1st, burning substantially all the zinc vapors from the reverberatory furnace in a combustion chamber at a predetermined temperature, 2nd, expanding and cooling these gases and vapors at such a rate that when leaving the combustion chamber they shall be of a predetermined temperature between 1100° F. and 1300° F.; 3rd, further cooling these gases and vapors in a pipe flue or trail so that they are at the temperature of about 500° F.; at the fan; 4th, still further cooling the gases and fumes so that they are at a predetermined temperature at the bag house which may be varied between 250° F. and 350° F. 5th, separating by selective separation in a cyclone foreign matters or gritty oxide between the fan and the bag house; and 6th, reheating the oxide for about half an hour at a temperature which may be varied between 1000° F. and 1100° F.

While I have above described the preferred form of my invention and the preferred apparatus for carrying it out, it will be understood that there is no limitation to the detail of the successive steps described nor to the structures illustrated except as specifically defined in the appended claims and that various modifications and additions to, subtractions from and reversals of the steps and apparatus above described may be resorted to without departing from the principle of my invention which I have now fully disclosed.

Having described my process I now proceed to outline the claims upon which I ask patent protection.

1. A process for the manufacture of high grade zinc oxide resulting from smelting zinc ores in a reverberatory furnace in which zinc vapors are produced, and comprising burning substantially all the zinc vapors thus produced at a predetermined temperature above 2000° F. but not exceeding 2350° F.

2. A process for the manufacture of high grade zinc oxide by smelting crude oxide in a reverberatory furnace thus producing concentrated zinc vapors substantially all of which are burned in a combustion chamber at a predetermined temperature above 2000° F. but not exceeding 2350° F.

3. A process for the manufacture of high grade zinc oxide comprising producing zinc vapors in a reverberatory furnace by smelting of zinc ores or crude zinc oxide and by burning substantially all the said zinc vapors produced in a combustion chamber, at a predetermined temperature above 2000° F. but not exceeding 2350° F. by the admission and through mixing of preheated air in said combustion chamber with the zinc vapors for the purpose of controlling the temperature of combustion.

4. A process for the manufacture of high grade zinc oxide comprising producing zinc vapors in a reverberatory furnace by smelting zinc ores or crude zinc oxide and by burning substantially all the zinc vapors produced in a combustion chamber at a predetermined temperature above 2000° F. but not exceeding 2350° F. and by the admission and thorough mixing of preheated air with the zinc vapors in said combustion chamber for the purpose of controlling the temperature of combustion, the said air being heated by the burning of the gases and vapors from the reverberatory furnace.

5. A process for the manufacture of high grade zinc oxide comprising producing zinc vapors in a reverberatory furnace by smelting zinc ores or crude zinc oxide and by burning substantially all the zinc vapors produced in a combustion chamber at a predetermined temperature above 2000° F. but not exceeding 2350° F and in cooling the resulting gases of combustion and fume down to a predetermined temperature between 1100° F. and 1300° F. at the outlet of said combustion chamber.

6. A process for the manufacture of high grade zinc oxide comprising producing zinc vapors in a reverberatory furnace by smelting zinc ores or crude zinc oxide and by burning substantially all the zinc vapors produced in a combustion chamber at a predetermined temperature above 2000° F. but not exceeding 2350° F. and in cooling the resulting gases of combustion and fume down to a predetermined temperature between 1100° F. and 1300° F. at the outlet during an interval of time not exceeding 30 seconds.

7. A process for the manufacture of high grade zinc oxide comprising producing zinc vapors in a reverberatory furnace by smelting zinc ores or crude zinc oxide and by burning substantially all the zinc vapors produced in a combustion chamber at a predetermined temperature above 2000° F. but not exceeding 2350° F. and in cooling the resulting gases of combustion and fume down to a predetermined temperature between 1000° F. and 1300° F. at the outlet and in conducting said gases and fume through a pipe flue or trail leading to a fan and following it a bag house and cooling the said gases and fume down to a predetermined temperature at the bags between 250° F. and 350° F.

8. A process for the manufacture of high grade zinc oxide comprising producing zinc vapors in a reverberatory furnace by smelting zinc ores or crude zinc oxide and by burning substantially all the zinc vapors produced in a combustion chamber at a predetermined temperature above 2000° F. but not exceeding 2350° F. and in cooling the resulting gases of combustion and fume down to a predetermined temperature between 1100° F. and 1300° F. at the outlet and in conducting said gases and fume through a pipe flue or trail leading to a fan and following it a bag house and cooling the said gases and fume down to a predetermined temperature at the bags between 250° F. and 350° F. by the admission of cooling air at intervals along the trail.

9. A process for the manufacture of high grade zinc oxide comprising producing zinc vapors in a reverberatory furnace by smelting zinc ores or crude zinc oxide and by burning substantially all the zinc vapors produced in a combustion chamber at a predetermined temperature above 2000° F. but not exceeding 2350° F. and in cooling the resulting gases of combustion and fume down to a predetermined temperature between 1100° F. and 1300° F. at the outlet and in conducting said gases through a pipe flue or trail leading to a fan and following it a cyclone separator and bag house and cooling the said gases and fume down to a predetermined temperature at the bags between 250° F. and 350° F.

10. A process for the manufacture of high grade zinc oxide comprising producing zinc vapors in a reverberatory furnace by smelting zinc ores or crude zinc oxide and by burning substantially all the zinc vapors produced in a combustion chamber at a predetermined temperature above 2000° F. but not exceeding 2350° F. and in cooling the resulting gases of combustion and fume down to a predetermined temperature between 1100° F. and 1300° F. at the outlet and in conducting said gases through a pipe flue or trail leading to a fan and following it a cyclone separator and bag house and cooling said gases and fume and in separating out in the cyclone separator heavy particles or foreign matter and of gritty zinc oxide.

11. A process for the manufacture of high grade zinc oxide comprising producing zinc vapors in a reverberatory furnace by smelting zinc ores or crude zinc oxide and by burning substantially all the zinc vapors produced in a combustion chamber at a predetermined temperature above 2000° F. but not exceeding 2350° F. and in cooling the resulting gases of combustion and fume down to a predetermined temperature between 1100° F. and 1300° F. at the outlet and in conducting said gases and fume through a pipe flue or trail leading to a fan and following it a bag house and cooling the said gases and fume down to a predetermined temperature at the bags between 250° F. and 350° F. and in collecting in the bag house the zinc fume in the shape of high grade zinc oxide.

12. A process for the manufacture of high grade zinc oxide comprising producing zinc vapors in a reverberatory furnace by smelting zinc ores or crude zinc oxide and by burning substantially all the zinc vapors produced in a combustion chamber at a predetermined temperature above 2000° F. but not exceeding 2350° F. and in cooling the resulting gases of combustion and fume down to a predetermined temperature between 1100° F. and 1300° F. at the outlet and in conducting said gases and fume through a pipe flue or trail leading to a fan and following it a bag house and cooling the said gases and fume down to a predetermined temperature at the bags between 250° F. and 350° F. and collecting in the bag house the zinc fume in the shape of high grade zinc oxide and by simply reheating it in a muffle furnace for about one half hour at a predetermined temperature between 1000° F. and 1100° F. to produce a very superior grade of zinc oxide.

13. That process of treating zinc carrying ores which comprises smelting said ores in a reducing atmosphere in a reverberatory furnace and in a reducing atmosphere in the presence of carbon and such other substances as will form a slag with the ore impurities and then conveying the zinc vapor into a combustion chamber and introducing air therewith whereby the vapors are oxidized and cooled, then separating the oxidized zinc from the remaining gaseous products.

14. The process of treating ores carrying a volatile metal which comprises mixing the ore with carbonaceous material and a flux to form a slag, then reducing the mixture in a reverberatory furnace and in a reducing atmosphere, then passing the metallic vapor of said volatile metal and the gases of combustion into a chamber and then introducing air by which said vapor is converted to metallic oxide and cooled and then separating the said oxide from the remaining gases.

15. A process for the manufacture of high grade zinc oxide comprising smelting crude zinc oxide containing sulphates in a reducing atmosphere in a reverberatory furnace in the presence of carbon and substances adapted to form a slag with the impurities in the crude zinc oxide, thereby producing concentrated zinc vapors relatively free of sulphur, burning said vapors in a combustion chamber in the presence of air and then separating the oxidized zinc from the remaining gaseous products.

In testimony whereof, I have signed this specification.

FREDERIC E. PIERCE.